(12) United States Patent
Dina et al.

(10) Patent No.: US 9,196,265 B2
(45) Date of Patent: Nov. 24, 2015

(54) DISK-DRIVE PULSE DURATION CONTROL SYSTEM

(71) Applicant: TEXAS INSTRUMENTS INCORPORATED, Dallas, TX (US)

(72) Inventors: Marius Vicentiu Dina, Inver Grove Heights, MN (US); Jeremy Robert Kuehlwein, Woodbury, MN (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/875,862

(22) Filed: May 2, 2013

(65) Prior Publication Data
US 2013/0308222 A1 Nov. 21, 2013

Related U.S. Application Data

(60) Provisional application No. 61/642,711, filed on May 4, 2012.

(51) Int. Cl.
*G11B 5/09* (2006.01)
*G11B 5/02* (2006.01)

(52) U.S. Cl.
CPC .. *G11B 5/09* (2013.01); *G11B 5/02* (2013.01); *G11B 5/022* (2013.01)

(58) Field of Classification Search
None
See application file for complete search history.

(56) References Cited

U.S. PATENT DOCUMENTS

| | | | |
|---|---|---|---|
| 6,285,221 B1* | 9/2001 | Leighton et al. | 327/110 |
| 6,301,068 B1* | 10/2001 | Ionescu | 360/68 |
| 2005/0128618 A1* | 6/2005 | Ikekame et al. | 360/46 |

* cited by examiner

*Primary Examiner* — Daniell L Negron
(74) *Attorney, Agent, or Firm* — John R. Pessetto; Frank D. Cimino

(57) ABSTRACT

One embodiment includes a pulse duration control system for a magnetic disk-drive system. A rise delay system generates first control voltages in response to a write data input signal changing between a first state and a second state. A fall delay system generates second control voltages in response to the write data input signal changing between the first and second states. A comparator system generates a rising-edge overshoot signal and a falling-edge overshoot signal based on a comparison of the first and second control voltages. The rising-edge overshoot signal can set a duration of a positive overshoot current pulse for a write current at a transition of the write data input signal from the first state to the second state, and the falling-edge overshoot signal can set a duration of a negative overshoot current pulse for the write current at a transition from the second state to the first state.

19 Claims, 4 Drawing Sheets

DISK-DRIVE PULSE DURATION CONTROL SYSTEM

CROSS-REFERENCE TO RELATED APPLICATION

This application claims the benefit of U.S. Provisional Patent Application 61/642,711 filed on 4 May 2012, entitled IMPROVED DURATION CONTROL WITH RESET FOR HDD, the entirety of which is incorporated by reference herein.

TECHNICAL FIELD

This disclosure relates generally to electronic circuit systems, and specifically to a disk-drive pulse duration control system.

BACKGROUND

Preamplifier circuits can be implemented in a magnetic disk-drive system to generate an overshoot current for writing data to a magnetic medium (e.g., a magnetic disk drive, such as a hard-disk drive). As an example, it can be desirable to tune a pulse duration of the overshoot current, such as greater than a given duration of a data bit as dictated by a write data input signal. For example, it may be desirable to set a duration of the overshoot current to greater than duration of a single bit to provide current overshoot for shorter bit patterns, but not longer patterns, to achieve substantially better data rates for drive optimization. However, for pulse duration control systems that implement delay of the write data input signal, overshoot current pulse durations greater than a single bit can cause unacceptable jitter and bad eye patterns based on delayed write data arriving after the write data input signal has already changed states.

SUMMARY

One embodiment includes a pulse duration control system for a magnetic disk-drive system. A rise delay system can generate first control voltages in response to a write data input signal changing between a first state and a second state. A fall delay system can generate second control voltages in response to the write data input signal changing between the first and second states. A comparator system can generate a rising-edge overshoot signal and a falling-edge overshoot signal based on a comparison of the first and second control voltages. The rising-edge overshoot signal can set a duration of a positive overshoot current pulse for a write current at a transition of the write data input signal from the first state to the second state, and the falling-edge overshoot signal can set a duration of a negative overshoot current pulse for the write current at a transition from the second state to the first state.

Another embodiment includes a method for method for implementing pulse duration control in a magnetic disk-drive system. The method includes generating a positive ramp voltage and a negative ramp voltage at each transition of a write data input signal between a first state and a second state. The method also includes generating a rising-edge overshoot signal and a falling-edge overshoot signal based on a relative magnitude of the positive ramp voltage and the negative ramp voltage at each transition of the write data input signal. The method also includes adding a positive overshoot current pulse to a magnetic disk-drive write current that is provided through a write element in response to a transition of the write data input signal from a first state to a second state. The positive overshoot current pulse can have a maximum pulse-width of a predetermined duration based on the rising-edge overshoot signal and a minimum pulse-width of a single bit of data as provided by the write data input signal. The method further includes adding a negative overshoot current pulse to the magnetic disk-drive write current in response to a transition of the write data input signal from the second state to the first state. The negative overshoot current pulse can have a maximum pulse-width of a predetermined duration based on the falling-edge overshoot signal and a minimum pulse-width of a single bit of data as provided by the write data input signal.

Another embodiment includes a magnetic disk-drive write system. The system includes a pulse duration control system configured to generate a rising-edge overshoot signal and a falling-edge overshoot signal based on a write data input signal, the rising-edge overshoot signal being associated with a positive overshoot current pulse of a write current and the falling-edge overshoot signal associated with a negative overshoot current pulse of the write current. The system also includes a write predriver configured to generate a first pulse signal based on the rising-edge overshoot signal and the write data input signal and a second pulse signal based on the falling-edge overshoot signal and the write data input signal, such that the first and second pulse signals have a maximum pulse-width of a predetermined duration based on the respective rising-edge and falling-edge overshoot signals and a minimum pulse-width of a single bit of data as provided by the write data input signal. The system further includes an output driver configured to generate the write current through a magnetic write element in response to the write data input signal. A magnitude of the write current can include the positive overshoot current pulse in response to the transition of the write data input signal from the first state to the second state based on the first pulse signal and can include the negative overshoot current pulse in response to the transition of the write data input signal from the second state to the first state based on the second pulse signal.

DETAILED DESCRIPTION

This disclosure relates generally to electronic circuit systems, and specifically to a disk-drive pulse duration control system. The disk-drive pulse duration control system can include a rise delay system, a fall delay system, and a comparator system. The rise delay system can generate a ramp voltage having a positive slope in response to each transition of a write data input signal and the fall delay system can generate a ramp voltage having a negative slope in response to each of the transitions of the write data input signal. The positive and negative slopes of the ramp voltages can be set based on a magnitude of current sources in each of the rise delay system and the fall delay system. The comparator system can be configured to compare the ramp voltages having the positive and negative slopes to generate a rising-edge overshoot signal and a falling-edge overshoot signal which are associated with a positive overshoot current pulse and a negative overshoot current pulse, respectively, for a write current that writes data to a magnetic disk-drive medium based on the write data input signal.

As an example, each of the rise delay system and the fall delay system can include a pair of control nodes that interconnect a current source and a switch. A given switch in the rise delay system can be activated in response to a transition of the write data input signal to reset the rising-edge overshoot signal and can be deactivated to increase the magnitude of the ramp voltage at the positive slope based on the magnitude of the current provided via the current source. As another example, a given switch in the fall delay system can be deactivated in response to a transition of the write data input signal to reset the rising-edge overshoot signal, and can be activated to couple an additional current source to the control node to pull current from the control node. As a result, the magnitude of the ramp voltage decreases at the negative slope based on a relative magnitude of the currents provided by the current sources. As a result of the creation of the rising-edge and falling-edge pulse signals separately with respect to each other, as opposed to merely delaying state transitions of the write data input signal provided by typical pulse duration control systems, jitter and timing problems can be substantially mitigated in high-data disk-drive write systems.

Figure 1:
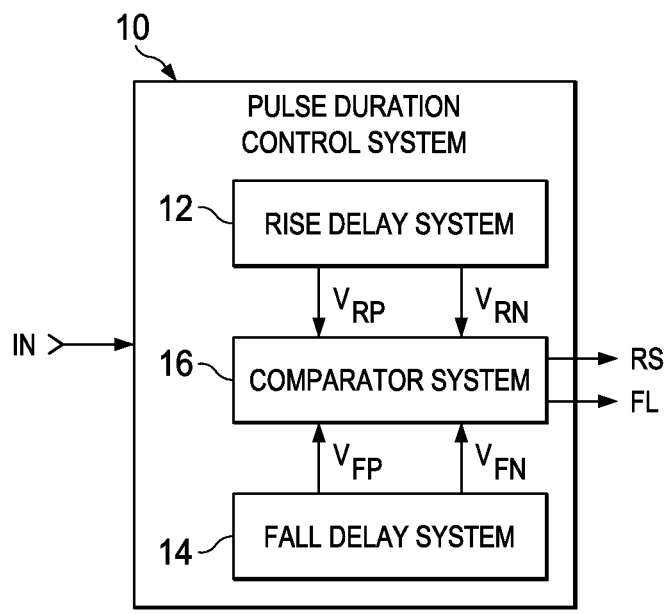
FIG. 1 illustrates an example of a pulse duration control system.

FIG. 1 illustrates an example of a pulse duration control system 10. The pulse duration control system 10 can be implemented in a magnetic disk-drive write system, such as in a hard disk-drive (HDD) write system. The pulse duration control system 10 is configured to generate a rising-edge overshoot signal RS and a falling-edge overshoot signal FL that can be associated with a positive overshoot current pulse and a negative overshoot current pulse, respectively. For example, the rising-edge overshoot signal RS and the falling-edge overshoot signal FL can be provided to a predriver circuit that is configured to generate pulse signals based on the rising-edge overshoot signal RS and a falling-edge overshoot signal FL and the write data input signal, such that a write current driver can generate the positive overshoot current pulse and the negative overshoot current pulse based on the pulse signals.

The pulse duration control system 10 includes a rise delay system 12, a fall delay system 14, and a comparator system 16. The rise delay system 12 is configured to generate a control voltage having a positive slope at each transition of a write data input signal IN. In the example of FIG. 1, the rise delay system 12 is configured to generate a first control voltage $V_{RP}$ having a positive slope in response to a transition of the write data input signal IN from a first state to a second state, and to generate a second control voltage $V_{RN}$ having a positive slope in response to a transition of the write data input signal IN from the second state to the first state. Similarly, the fall delay system 14 is configured to generate a control voltage having a negative slope at each transition of a write data input signal IN. In the example of FIG. 1, the fall delay system 14 is configured to generate a third control voltage $V_{FP}$ having a negative slope in response to a transition of the write data input signal IN from a first state to a second state, and to generate a fourth control voltage $V_{FN}$ having a negative slope in response to a transition of the write data input signal IN from the second state to the first state. As described herein, the slope (i.e., positive or negative) of the control voltages describes a gradual increase (e.g., positive slope) or gradual decrease (e.g., negative slope) of the magnitude of the control voltage in response to a given state change of the write data input signal IN.

As an example, the positive slope and the negative slope can be approximately equal and opposite. For example, each of the rise delay system 12 and the fall delay system 14 can include current sources configured to generate respective currents that have a magnitude that dictates the positive slope of the control voltages $V_{RP}$ and $V_{RN}$ and the negative slope of the control voltages $V_{FP}$ and $V_{FN}$. As described in greater detail herein, the positive slope of the control voltages $V_{RP}$ and $V_{RN}$ and the negative slope of the control voltages $V_{FP}$ and $V_{FN}$ can define a maximum pulse duration of a positive overshoot current pulse and a negative overshoot current pulse, respectively, associated with a write current in an associated magnetic disk-drive write system.

The comparator system 16 can be configured to compare respective control voltages generated by the rise delay system 12 and the fall delay system 14 to generate the rising-edge overshoot signal RS and the falling-edge overshoot signal FL. For example, the comparator system 16 can compare the first control voltage $V_{RP}$ and the third control voltage $V_{FP}$, and can assert the rising-edge overshoot signal RS in response to the first control voltage $V_{RP}$ increasing greater than the third control voltage $V_{FP}$. The rising-edge overshoot signal RS can be reset (e.g., de-asserted) in response to the write data input signal IN switching from the second state to the first state. Similarly, the comparator system 16 can compare the second control voltage $V_{RN}$ and the fourth control voltage $V_{FN}$, and can de-assert the falling-edge overshoot signal FS in response to the fourth control voltage $V_{FN}$ decreasing less than the second control voltage $V_{FP}$. The falling-edge overshoot signal FL can be reset (e.g., asserted) in response to the write data input signal IN switching from the first state to the second state.

As described previously, the magnitude of the positive slope of the control voltages $V_{RP}$ and $V_{RN}$ and the negative slope of the control voltages $V_{FP}$ and $V_{FN}$ can be set based on a magnitude of one or more current sources in the respective rise delay system 12 and the fall delay system 14. As an example, the positive slope of the control voltages $V_{RP}$ and $V_{RN}$ and the negative slope of the control voltages $V_{FP}$ and $V_{FN}$ can be set to define a maximum pulse duration of the positive overshoot current pulse and the negative overshoot current pulse, respectively, associated with the write current that is greater than a duration of a single bit, as dictated by the write data input signal IN. As a result, an associated magnetic disk-drive write system can achieve substantially rapid data rates for drive optimization. However, because the rising-edge overshoot signal and the falling-edge overshoot signal are reset at opposite transitions of the write data input signal IN, the pulse duration of the positive overshoot current pulse and the negative overshoot current pulse can be shortened to the duration of a single bit to substantially mitigate jitter in rapid switching of data to be written to the magnetic medium.

Figure 2:
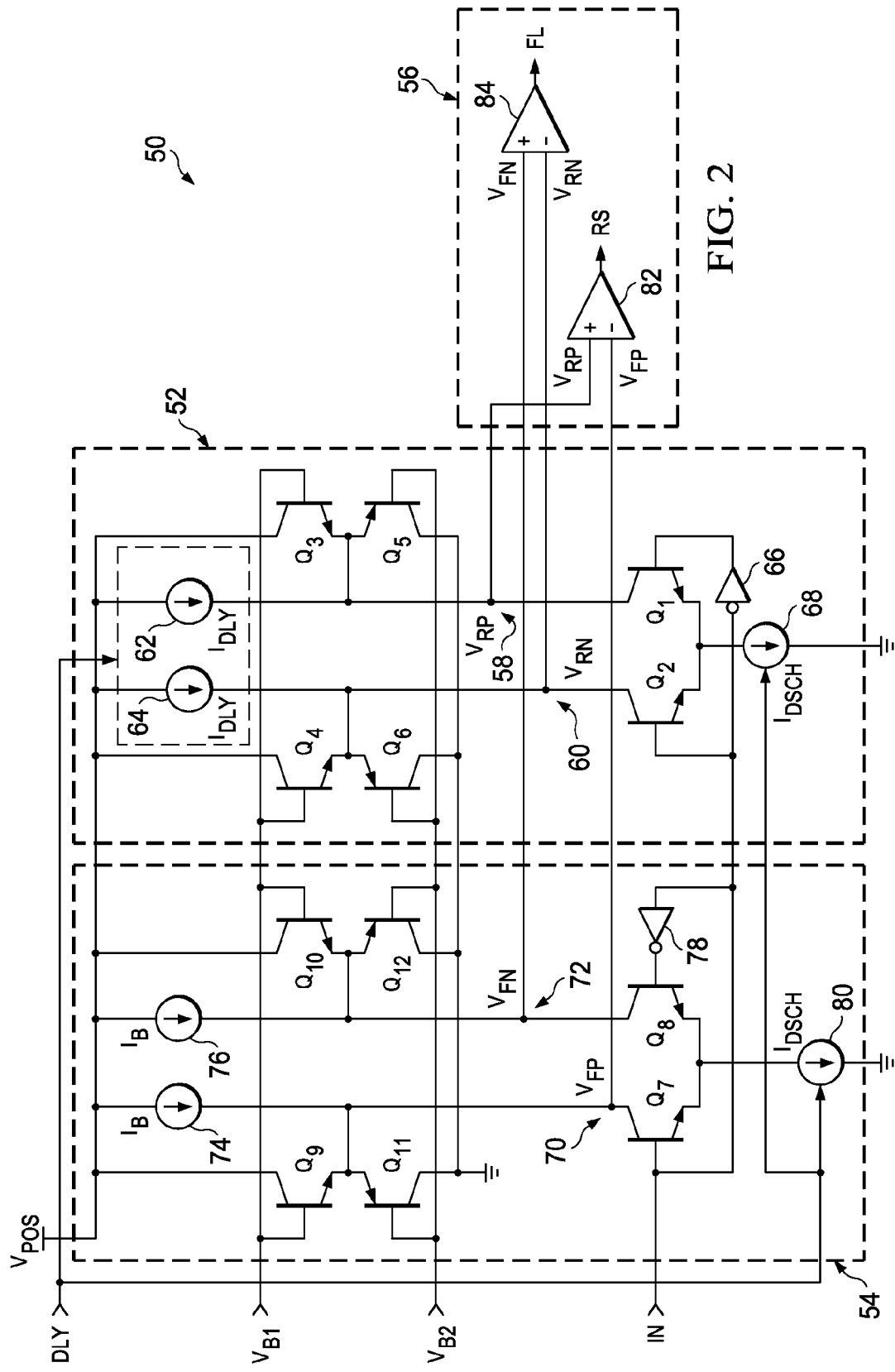
FIG. 2 illustrates an example of a pulse duration circuit.

FIG. 2 illustrates an example of a pulse duration control circuit 50. The pulse duration control circuit 50 can correspond to the pulse duration control system 10 in the example of FIG. 1, such that the pulse duration control circuit 50 can be implemented in a magnetic disk-drive write system (e.g., an HDD write system). As an example, the pulse duration circuit 50 can be implemented as or as part of an integrated circuit (IC).

The pulse duration control circuit 50 includes a rise delay system 52, a fall delay system 54, and a comparator system 56. The rise delay system 52 comprises a first control node 58 on which the first control voltage $V_{RP}$ is generated and a second control node 60 on which the second control voltage $V_{RN}$ is generated. The first control node 58 interconnects a switch Q1, demonstrated in the example of FIG. 2 as an NPN bipolar junction transistor (BJT), and a current source 62 that is configured to generate a current $I_{DLY}$ via a power voltage $V_{POS}$. The second control node 60 interconnects a switch $Q_2$, which is also configured as an NPN BJT, and a current source 64 that likewise generates the current $I_{DLY}$. The switch $Q_2$ is activated in response to assertion of the write data input signal IN, and the switch $Q_1$ is activated in response to de-assertion of the write data input signal IN via an inverter 66. An emitter of each of the switches $Q_1$ and $Q_2$ is coupled to a current source 68 that is configured to conduct a current $I_{DSCH}$. In addition, the rise delay system 52 includes a transistor $Q_3$ and a transistor $Q_4$ configured as NPN BJTs, and also includes a transistor $Q_5$ and a transistor $Q_6$ configured as PNP BJTs. The transistors $Q_3$ and $Q_4$ each include a base that is provided a first bias voltage $V_{B1}$, and the transistors $Q_5$ and $Q_6$ each include a base that is provided a second bias voltage $V_{B2}$. Alternatively, the transistors $Q_3$ and $Q_4$ and the transistors $Q_5$ and $Q_6$ can be diode-connected. As described in greater detail herein, the transistors $Q_3$ and $Q_5$ are configured as a clamping circuit with respect to the first control node 58, and the transistors $Q_4$ and $Q_6$ are configured as a clamping circuit with respect to the second control node 60.

The fall delay system 54 comprises a third control node 70 on which the third control voltage $V_{FP}$ is generated and a fourth control node 72 on which the fourth control voltage $V_{FN}$ is generated. The third control node 70 interconnects a switch $Q_7$, configured as an NPN BJT, and a current source 74 that is configured to generate a current $I_B$ via the power voltage $V_{POS}$. The fourth control node 72 interconnects a switch $Q_8$, which is also configured as an NPN BJT, and a current source 76 that likewise generates the current $I_B$. The switch $Q_7$ is activated in response to assertion of the write data input signal IN, and the switch $Q_8$ is activated in response to de-assertion of the write data input signal IN via an inverter 78. An emitter of each of the switches $Q_7$ and $Q_8$ is coupled to a current source 80 that is configured to conduct the current $I_{DSCH}$. In addition, the fall delay system 54 includes a transistor $Q_9$ and a transistor $Q_{10}$ configured as NPN BJTs, and also includes a transistor $Q_{11}$ and a transistor $Q_{12}$ configured as PNP BJTs. The transistors $Q_9$ and $Q_{10}$ each include a base that is provided the third bias voltage $V_{B1}$, and the transistors $Q_{11}$ and $Q_{12}$ each include a base that is provided the fourth bias voltage $V_{B2}$. Alternatively, the transistors $Q_9$ and $Q_{10}$ and the transistors $Q_{11}$ and $Q_{12}$ can be diode-connected. Similar to as described previously regarding the rise delay system 52, the transistors $Q_9$ and $Q_{11}$ are configured as a clamping circuit with respect to the third control node 70, and the transistors $Q_{10}$ and $Q_{12}$ are configured as a clamping circuit with respect to the fourth control node 72.

The rise delay system 52 can thus generate the control voltages $V_{RP}$ and $V_{RN}$ and the fall delay system 54 can thus generate the control voltages $V_{FP}$ and $V_{FN}$ based on state transitions of the write data input signal IN and based on a relative magnitude of the currents $I_{DLY}$ and $I_{DSCH}$ and the currents $I_B$ and $I_{DSCH}$. In the example of FIG. 2, in response to a rising-edge of the write data input signal IN, the switches $Q_2$ and $Q_7$ activate and the switches $Q_1$ and $Q_8$ deactivate. As a result, the control voltage $V_{RN}$ can decrease substantially rapidly based on a relative magnitude of the currents $I_{DLY}$ and $I_{DSCH}$, and the control voltage $V_{RP}$ can begin to increase at a positive slope based on the current $I_{DLY}$ being provided to the control node 58 and based on a component capacitance (e.g., parasitic capacitance) of the circuit components coupled to the control node 58. In addition, the control voltage $V_{FP}$ can begin to decrease at a negative slope based on a relative magnitude of the currents $I_B$ and $I_{DSCH}$, and the control voltage $V_{FN}$ can increase rapidly based on the current $I_B$. Conversely, in response to a falling-edge of the write data input signal IN, the switches $Q_1$ and $Q_8$ activate and the switches $Q_2$ and $Q_7$ deactivate. As a result, the control voltage $V_{RP}$ can decrease substantially rapidly based on a relative magnitude of the currents $I_{DLY}$ and $I_{DSCH}$, and the control voltage $V_{RN}$ can begin to increase at the positive slope based on the current $I_{DLY}$. In addition, the control voltage $V_{FN}$ can begin to decrease at a negative slope based on the relative magnitude of the currents $I_B$ and $I_{DSCH}$, and the control voltage $V_{FP}$ can increase rapidly based on the current $I_B$.

As an example, the magnitude of the current $I_{DSCH}$ can be greater than the current $I_B$, which can in turn be greater than the current $I_{DLY}$. For example, the current $I_{DSCH}$ can have a magnitude that is approximately equal to $I_B$ plus $I_{DLY}$. Therefore, the net magnitude of current that is provided to one of the control nodes 58 and 60 at deactivation of the respective one of the switches $Q_1$ and $Q_2$ (e.g., $I_{DLY}$) is approximately equal to the net magnitude of current that is provided from one of the control nodes 70 and 72 at deactivation of the respective one of the switches $Q_7$ and $Q_8$ (e.g., $I_{DSCH}-I_B=I_{DLY}$). Furthermore, the rise-delay system 52 and the fall-delay system 54 can be fabricated in a process-matched manner, such that the circuit components of each of the rise-delay system 52 and the fall-delay system 54 can have substantially matched characteristics. Therefore, based on the approximately equal magnitude of current provided to the control nodes 58 and 60 and provided from the control nodes 70 and 72, and based on the matched characteristics of the rise-delay system 52 and the fall-delay system 54, the slope of the control voltages $V_{RP}$ and $V_{RN}$ can be approximately equal and opposite to the slope of the control voltages $V_{FP}$ and $V_{FN}$.

In the example of FIG. 2, the current sources 62, 64, 68, and 80 can be configured as adjustable current sources. As a result, the magnitude of the currents $I_{DLY}$ and $I_{DSCH}$ can be variable in response to a control signal DLY. As an example, the control signal DLY can be provided once upon fabrication to set the magnitude of the current $I_{DLY}$, and thus the component of the current $I_{DLY}$ in the total magnitude of the $I_{DSCH}$ (e.g., $I_{DSCH}=I_B+I_{DLY}$), such that the magnitudes of the currents $I_{DLY}$ and $I_{DSCH}$ are substantially constant during operation of the pulse duration control circuit 50. As a result, the magnitudes of the currents $I_{DLY}$ and $I_{DSCH}$ can be set at fabrication of the pulse duration control circuit 50 to set the duration of the positive overshoot current pulse and the negative overshoot current pulse. For example, the control signal DLY can correspond to one or more dip switches or other static settings. As another example, the control signal DLY can be a dynamic signal that can be tuned during operation of the pulse duration control circuit 50. As a result, the magnitudes of the currents $I_{DLY}$ and $I_{DSCH}$ can be changed during operation of the pulse duration control circuit 50 to dynamically change the duration of the positive overshoot current pulse and the negative overshoot current pulse.

The clamping circuits provided by the transistors $Q_3$ and $Q_5$, the transistors $Q_4$ and $Q_6$, the transistors $Q_9$ and $Q_{11}$, and the transistors $Q_{10}$ and $Q_{12}$ can be configured to substantially limit the magnitude of the control voltage $V_{RP}$, the control voltage $V_{RN}$, the control voltage $V_{FP}$, and the control voltage $V_{FN}$, respectively. In response to a given one of the control voltages $V_{RP}$ and $V_{RN}$ increasing to a given predetermined magnitude defined by the bias voltage $V_{B2}$, the respective one of the transistors $Q_5$ and $Q_6$ activates to sink a portion of the current $I_{DLY}$ to a low voltage rail, demonstrated in the example of FIG. 2 as ground. Therefore, the control voltages $V_{RP}$ and $V_{RN}$ can have a maximum magnitude that is defined by the bias voltage $V_{B2}$ (e.g., $V_{B2}$ plus a base-emitter voltage $V_{BE}$ of the respective transistors $Q_5$ and $Q_6$). Similarly, in response to a given one of the control voltages $V_{FP}$ and $V_{FN}$ increasing to the given predetermined magnitude defined by the bias voltage $V_{B2}$, the respective one of the transistors $Q_{11}$ and $Q_{12}$ activates to sink a portion of the current $I_B$ to ground, such that the control voltages $V_{FP}$ and $V_{FN}$ can likewise have a maximum magnitude that is defined by the bias voltage $V_{B2}$.

Conversely, in response to a given one of the control voltages $V_{RP}$ and $V_{RN}$ decreasing to a given predetermined magnitude defined by the bias voltage $V_{B1}$, the respective one of the transistors $Q_3$ and $Q_4$ activates to provide current to the respective one of the control nodes 58 and 60 from the power voltage $V_{POS}$. Therefore, the control voltages $V_{RP}$ and $V_{RN}$ can have a minimum magnitude that is defined by the bias voltage $V_{B1}$ (e.g., $V_{B1}$ minus a base-emitter voltage $V_{BE}$ of the respective transistors $Q_3$ and $Q_4$). Similarly, in response to a given one of the control voltages $V_{FP}$ and $V_{FN}$ decreasing to the given predetermined magnitude defined by the bias voltage $V_{B1}$, the respective one of the transistors $Q_9$ and $Q_{10}$ activates to provide current from the power voltage $V_{POS}$, such that the control voltages $V_{FP}$ and $V_{FN}$ can likewise have a minimum magnitude that is defined by the bias voltage $V_{B1}$.

The comparator system 56 includes a first comparator 82 and a second comparator 84. The first comparator 82 receives the control voltage $V_{RP}$ at a non-inverting input and the control voltage $V_{FP}$ at an inverting input. Therefore, the first comparator 82 is configured to compare the relative magnitudes of the control voltages $V_{RP}$ and $V_{FP}$, and to assert the rising-edge overshoot signal RS in response to the control voltage $V_{RP}$ increasing greater than the control voltage $V_{FP}$. Similarly, second comparator 84 receives the control voltage $V_{FN}$ at a non-inverting input and the control voltage $V_{RN}$ at an inverting input. Therefore, the second comparator 84 is configured to compare the relative magnitudes of the control voltages $V_{RN}$ and $V_{FN}$, and to de-assert the falling-edge overshoot signal FL in response to the control voltage $V_{RN}$ increasing greater than the control voltage $V_{FN}$.

Figure 3:
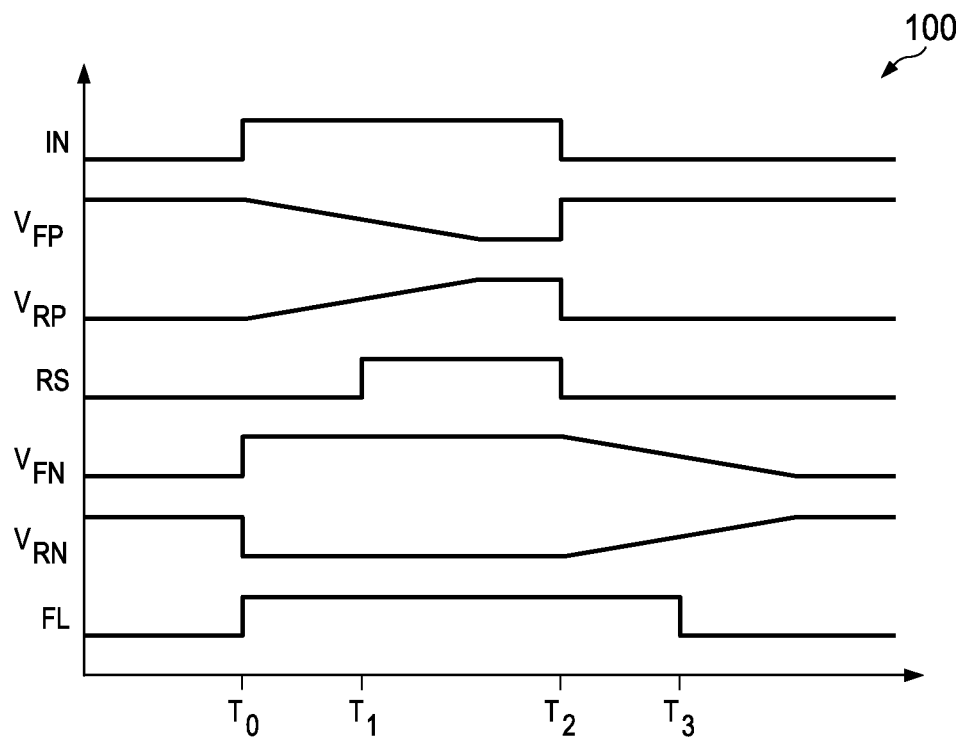
FIG. 3 illustrates an example of a timing diagram.

FIG. 3 illustrates an example of a timing diagram 100. The timing diagram 100 demonstrates a plurality of signals plotted over time, including the write data input signal IN, the control voltages $V_{RP}$ and $V_{FP}$, the control voltages $V_{RN}$ and $V_{FP}$, the rising-edge overshoot signal RS, and the falling-edge overshoot signal FL. The timing diagram 100 can therefore correspond to the operation of the pulse duration control circuit 50 in the example of FIG. 2. Accordingly, reference is to be made to the example of FIG. 2 in the following description of the example of FIG. 3. In addition, while the signals in the example of FIGS. 2 and 3 are demonstrated as single-ended signals, it is to be understood that the signals, such as the write data input signal IN, can be configured as common-mode signals.

Prior to a time $T_0$, the write data input signal IN has a logic-low state, at which time the control voltages $V_{FP}$ and $V_{RN}$ are held at a maximum magnitude, such as defined by the bias voltage $V_{B2}$, and the control voltages $V_{RP}$ and $V_{FN}$ are held at a minimum magnitude, such as defined by the bias voltage $V_{B1}$. Therefore, based on the comparators 82 and 84, the rising-edge overshoot signal RS and the falling-edge overshoot signal FL are held at a logic-low state. At the time $T_0$, the write data input signal IN is asserted from the logic-low state to the logic-high state. In response, the switches $Q_1$ and $Q_7$ activate and the switches $Q_2$ and $Q_8$ deactivate. As a result, the control voltage $V_{FP}$ begins to decrease at the negative slope based on the difference in magnitude of the current $I_{DSCH}$ flowing from the control node 70 and the current $I_B$ flowing into the control node 70 (e.g., equal to the magnitude of the current $I_{DLY}$). Similarly, the control voltage $V_{RP}$ begins to increase at the positive slope based on the magnitude of the current $I_{DLY}$ flowing into the control node 58. The control voltage $V_{FN}$ increases substantially rapidly based on the flow of the current $I_B$ into the control node 72, and the control voltage $V_{RN}$ decreases substantially rapidly based on the difference in magnitude of the current $I_{DSCH}$ flowing from the control node 60 and the current $I_{DLY}$ flowing into the control node 60.

In response to the rapid increase of the control voltage $V_{FN}$ and the rapid decrease of the voltage $V_{RN}$, the comparator 84 asserts the falling-edge overshoot signal FL based on the relative magnitudes of the control voltages $V_{FN}$ and $V_{RN}$. As a result, the falling-edge overshoot signal FL resets approximately concurrently with the rising-edge of the write data input signal IN. In the example of FIG. 3, the increase of the control voltage $V_{FN}$ and the decrease of the control voltage $V_{RN}$ are demonstrated as occurring substantially concurrently with the rising-edge of the write data input signal IN for simplicity. However, it is to be understood that the increase of the control voltage $V_{FN}$ and the decrease of the control voltage $V_{RN}$ can have a substantially high slope (e.g., positive and negative, respectively).

At a time $T_1$, the control voltage $V_{RP}$ increases to a magnitude slightly greater than the decreasing magnitude of the control voltage $V_{FP}$. Therefore, the comparator 82 asserts the rising-edge overshoot signal RS from a logic-low state to a logic-high state based on the relative magnitude of the control voltages $V_{RP}$ and $V_{FP}$. Accordingly, the assertion of the rising-edge overshoot signal RS can dictate a pulse duration of a positive overshoot current pulse that is added to a write current in an associated magnetic disk-drive write system for writing data onto a magnetic medium. For example, the positive overshoot current pulse can have a duration (e.g., pulse width) that begins at the assertion of the write data input signal IN and ends at the assertion of the rising-edge overshoot signal RS. Accordingly, the positive overshoot current pulse can have a duration from the time $T_0$ to the time $T_1$.

At a time $T_2$, the write data input signal IN is de-asserted from the logic-high state to the logic-low state. In response, the switches $Q_2$ and $Q_8$ activate and the switches $Q_1$ and $Q_7$ deactivate. As a result, the control voltage $V_{FN}$ begins to decrease at the negative slope based on the difference in magnitude of the current $I_{DSCH}$ flowing from the control node 72 and the current $I_B$ flowing into the control node 72 (e.g., equal to the magnitude of the current $I_{DLY}$). Similarly, the control voltage $V_{RN}$ begins to increase at the positive slope based on the magnitude of the current $I_{DLY}$ flowing into the control node 60. The control voltage $V_{FP}$ increases substantially rapidly based on the flow of the current $I_B$ into the control node 70, and the control voltage $V_{RP}$ decreases substantially rapidly based on the difference in magnitude of the current $I_{DSCH}$ flowing from the control node 58 and the current $I_{DLY}$ flowing into the control node 58. In response to the rapid increase of the control voltage $V_{FP}$ and the rapid decrease of the voltage $V_{RP}$, the comparator 82 de-asserts the rising-edge overshoot signal RS based on the relative magnitudes of the control voltages $V_{FP}$ and $V_{RP}$. As a result, the rising-edge overshoot signal RS resets approximately concurrently with the falling-edge of the write data input signal IN.

At a time $T_3$, the control voltage $V_{RN}$ increases to a magnitude slightly greater than the decreasing magnitude of the control voltage $V_{FN}$. Therefore, the comparator 84 de-asserts the falling-edge overshoot signal FL from a logic-high state to a logic-low state based on the relative magnitude of the control voltages $V_{RN}$ and $V_{FN}$. Accordingly, the de-assertion of the falling-edge overshoot signal FL can dictate a pulse duration of a negative overshoot current pulse that is added to the write current for writing data onto a magnetic medium. For example, the negative overshoot current pulse can have a duration (e.g., pulse width) that begins at the de-assertion of the write data input signal IN and ends at the de-assertion of the falling-edge overshoot signal FL. Accordingly, the negative overshoot current pulse can have a duration from the time $T_2$ to the time $T_3$. Thus, the pulse duration of the positive overshoot current pulse can be approximately the same as the pulse duration of the negative overshoot current pulse.

As described previously and demonstrated in the example of FIG. 3, the positive slope of the control voltages $V_{RP}$ and $V_{RN}$ and the negative slope of the control voltages $V_{FP}$ and $V_{FN}$ can be set to define a maximum pulse duration of the positive overshoot current pulse and the negative overshoot current pulse, respectively, associated with the write current that is greater than a duration of a single bit, as dictated by the write data input signal IN. However, because the rising-edge overshoot signal and the falling-edge overshoot signal are reset at opposite transitions of the write data input signal IN, the pulse duration of the positive overshoot current pulse and the negative overshoot current pulse can be shortened to the duration of a single bit. Therefore, in the example of FIG. 3, the time duration from the times $T_0$ and $T_1$ and from the times $T_2$ to $T_3$ can each be greater than the duration of a single bit, as provided by the write data input signal IN. Therefore, a state transition of the write data input signal IN after the time $T_0$ or the time $T_2$ but prior to the time $T_1$ or the time $T_3$, respectively, would result in no change of state in the rising-edge overshoot signal RS or the falling-edge overshoot signal FL, respectively. Accordingly, the pulse duration of the positive overshoot current pulse and the negative overshoot current pulse can have a duration that is shortened to the width of a single bit for single-bit data transitions provided by the write data input signal IN to substantially mitigate jitter.

Figure 4:
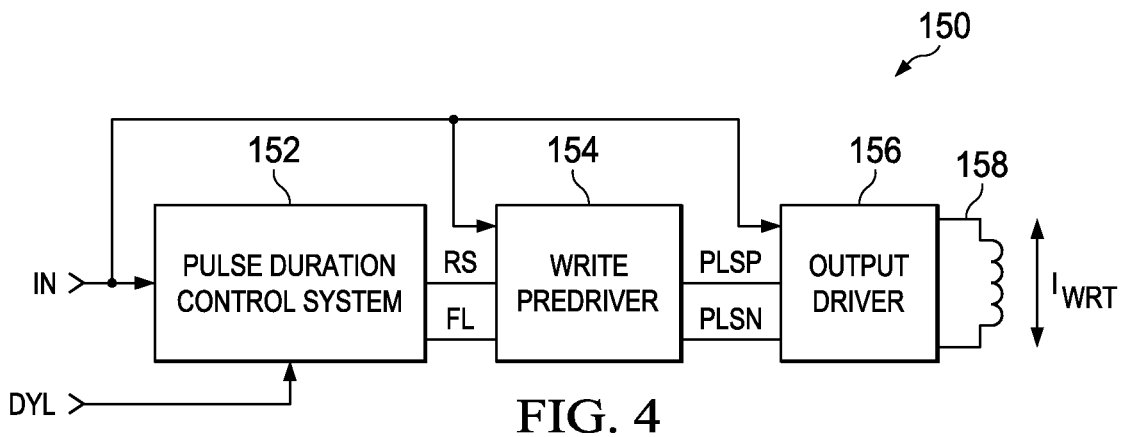
FIG. 4 illustrates an example of a magnetic disk-drive write system.

FIG. 4 illustrates an example of a magnetic disk-drive write system 150. The magnetic disk-drive write system 150 can be implemented in any of a variety of disk-drive systems, such as a peripheral disk-drive or an HDD. The magnetic disk-drive write system 150 includes a pulse duration control system 152 that can receives the write data input signal IN and can receive a control signal DLY. As an example, the pulse duration control system 152 can be configured substantially similar to the pulse duration control circuit 50 in the example of FIG. 2. The pulse duration control system 152 is configured to generate the rising-edge overshoot signal RS and the falling-edge overshoot signal FL, such as based on comparing control voltages having a positive slope and a negative slope. The positive and negative slopes of the control voltages can be, for example, approximately equal and opposite, and can be set based on the control voltage DLY.

The magnetic disk-drive write system 150 also includes a write predriver 154 that is configured to generate a positive pulse signal PLSP and a negative pulse signal PLSN that can each have a pulse width corresponding to a pulse width of a positive overshoot current pulse and a negative overshoot current pulse, respectively. For example, the write predriver 154 can include logic that defines the positive pulse signal PLSP as a logical-AND of the write data input signal IN and an inverse of the rising-edge overshoot signal RS, and that defines the negative pulse signal PLSN as a logical-AND of the falling-edge overshoot signal FL and an inverse of the write data input signal IN. Therefore, the positive pulse signal PLSP and the negative pulse signal PLSN can each have a maximum duration that is greater than a duration of a single bit for more than one consecutive equal data bit, and a duration that is approximately equal to a single bit for single bit transitions, based on the logic-state of the write data input signal IN.

The magnetic disk-drive write system 150 further includes an output driver 156 that is configured to generate a write current $I_{WRT}$ that is provided through a magnetic write element 158, demonstrated in the example of FIG. 4 as an inductor. The write current $I_{WRT}$ can thus generate a magnetic field through the write element 158 to change a magnetic state of a magnetic medium to write a corresponding bit onto the magnetic medium. The write current $I_{WRT}$ can have a polarity through the magnetic write element 158 that is based on the value of the logic bit that is written to the magnetic medium, as provided by the write data input signal IN. Additionally, to overcome any magnetism in the magnetic write element 158 and on the magnetic medium, the output driver 156 can be configured to add a positive overshoot current pulse to the write current $I_{WRT}$ on rising-edge transitions of the write data input signal IN, and to add a negative overshoot current pulse to the write current $I_{WRT}$ on falling-edge transitions of the write data input signal IN. The positive and negative overshoot current pulses can thus have a duration that is set based on the positive pulse signal PLSP and the negative pulse signal PLSN, respectively.

Figure 5:
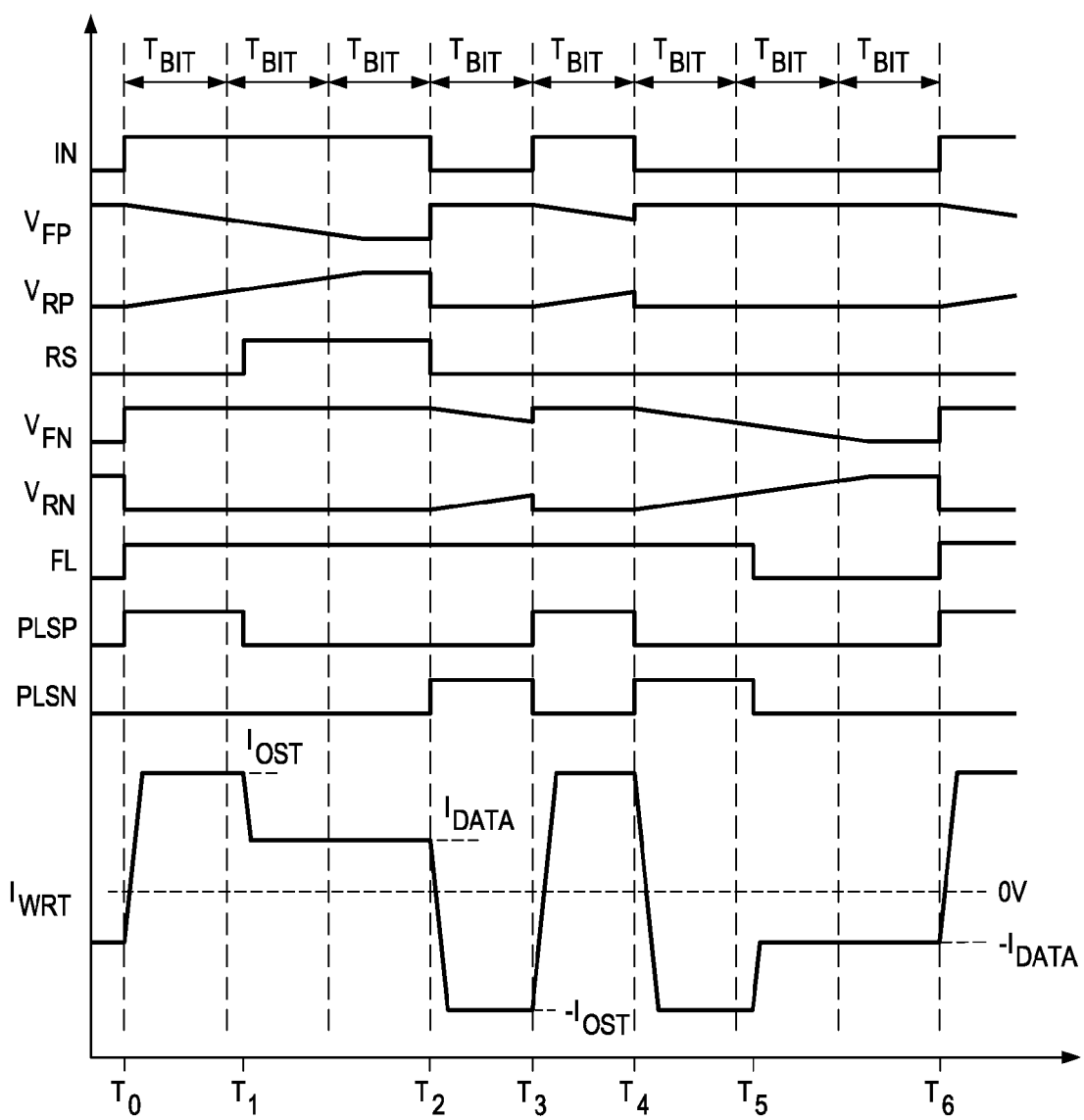
FIG. 5 illustrates another example of a timing diagram.

FIG. 5 illustrates another example of a timing diagram 200. The timing diagram 200 demonstrates a plurality of signals plotted over time, including the write data input signal IN, the control voltages $V_{RP}$ and $V_{FP}$, the control voltages $V_{RN}$, and $V_{FP}$, the rising-edge overshoot signal RS, the falling-edge overshoot signal FL, the positive pulse signal PLSP, the negative pulse signal PLSN, and the write current $I_{WRT}$. The timing diagram 200 can therefore correspond to the operation of the pulse duration control circuit 50 and the magnetic disk-drive write system 150 in the example of FIGS. 2 and 4. Accordingly, reference is to be made to the example of FIGS. 2 and 4 in the following description of the example of FIG. 5.

Prior to a time $T_0$, the write data input signal IN has a logic-low state, at which time the control voltages $V_{FP}$ and $V_{RN}$ are held at a maximum magnitude and the control voltages $V_{RP}$ and $V_{FN}$ are held at a minimum magnitude. Therefore, the rising-edge overshoot signal RS and the falling-edge overshoot signal FL are held at a logic-low state. At the time $T_0$, the write data input signal IN is asserted from the logic-low state to the logic-high state. As a result, the control voltage $V_{FP}$ begins to decrease at the negative slope and the control voltage $V_{RP}$ begins to increase at the positive slope, similar to as described in the example of FIG. 3. In addition, the control voltage $V_{FN}$ increases substantially rapidly and the control voltage $V_{RN}$ decreases substantially rapidly, similar to as described in the example of FIG. 3. The write predriver 154 can thus likewise assert the positive pulse signal PLSP based on the state of the write data input signal IN and the state of the rising-edge overshoot signal RS (e.g., a logical-AND of the write data input signal IN and an inverse of the rising-edge overshoot signal RS). As a result of the transition of the write data input signal IN from the logic-low state to the logic-high state at the time $T_0$, the write current $I_{WRT}$ increases from a negative magnitude to a positive magnitude beginning approximately at the time $T_0$. Because the positive pulse signal PLSP is asserted, the write current $I_{WRT}$ increases to a magnitude of $L_{OST}$ that can correspond to a positive overshoot voltage (e.g., approximately 90 mA).

In the example of FIG. 5, the timing diagram 200 is divided into bit lengths that each has a duration of $T_{BIT}$. Thus, each bit length of $T_{BIT}$ duration corresponds to a single bit of duration as provided by the write data input signal IN. The time $T_0$ is substantially aligned to a bit transition, as provided by the rising-edge of the write data input signal IN. A time $T_1$ occurs after the next bit transition subsequent to the time $T_0$. Therefore, the duration of time from $T_0$ to $T_1$ is greater than a duration $T_{BIT}$. At the time $T_1$, the control voltage $V_{RP}$ increases to a magnitude slightly greater than the decreasing magnitude of the control voltage $V_{FP}$. Therefore, the rising-edge overshoot signal RS is asserted from a logic-low state to a logic-high state based on the relative magnitude of the control voltages $V_{RP}$ and $V_{FP}$ (e.g., based on the comparator 82). Accordingly, upon assertion of the rising-edge overshoot signal RS, the write predriver 154 can de-assert the positive pulse signal PLSP, thus indicating the end of the positive overshoot current pulse. As a result, the write current $I_{WRT}$ decreases beginning at the time $T_1$ from $I_{OST}$ to $I_{DATA}$ corresponding to a magnitude of current sufficient to continue to write the same state of data absent an overshoot current pulse (e.g., approximately 40 mA). Therefore, the pulse duration of the positive overshoot current pulse provided by the positive pulse signal PLSP is greater than the duration $T_{BIT}$ of a single bit.

At a time $T_2$, the write data input signal IN is de-asserted from the logic-high state to the logic-low state, thus ending a consecutive three bits of same state data written to the magnetic medium, as demonstrated by three consecutive durations of $T_{BIT}$ from the time $T_0$ to the time $T_2$. In response, the control voltage $V_{FN}$ begins to decrease at the negative slope and the control voltage $V_{RN}$ begins to increase at the positive slope. In addition, the control voltage $V_{FP}$ increases substantially rapidly and the control voltage $V_{RP}$ decreases substantially rapidly. In response to the rapid increase of the control voltage $V_{FP}$ and the rapid decrease of the voltage $V_{RP}$, the rising-edge overshoot signal RS is de-asserted based on the relative magnitudes of the control voltages $V_{FP}$ and $V_{RP}$. As a result, the rising-edge overshoot signal RS resets approximately concurrently with the falling-edge of the write data input signal IN. The write predriver 154 can thus likewise assert the negative pulse signal PLSN based on the state of the write data input signal IN and the state of the falling-edge overshoot signal FL (e.g., a logical-AND of the falling-edge overshoot signal FL and an inverse of the write data input signal IN). As a result of the transition of the write data input signal IN from the logic-high state to the logic-low state at the time $T_2$, the write current $I_{WRT}$ decreases from $I_{DATA}$ to a negative magnitude beginning approximately at the time $T_2$. Because the negative pulse signal PLSN is asserted, the write current $I_{WRT}$ decreases to a magnitude of $-I_{OST}$ that can correspond to a negative overshoot voltage (e.g., approximately -90 mA).

At a time $T_3$, one bit duration $T_{BIT}$ subsequent to the time $T_2$, the write data input signal IN is asserted from the logic-low state to the logic-high state. As a result, the control voltage $V_{FP}$ begins to decrease at the negative slope and the control voltage $V_{RP}$ begins to increase at the positive slope, and the control voltage $V_{FN}$ again increases substantially rapidly and the control voltage $V_{RN}$ again decreases substantially rapidly. However, because the control voltage $V_{RN}$ did not increase greater than the decreasing magnitude of the control voltage $V_{FN}$ prior to the time $T_3$, the state of the rising-edge overshoot signal RS and the falling-edge overshoot signal FL do not change at the time $T_3$. As a result, the write predriver 154 can thus de-assert the negative pulse signal PLSN and can assert the positive pulse signal PLSP based on the state of the write data input signal IN and the continuous state of the rising-edge overshoot signal RS and the falling-edge overshoot signal FL. As a result of the transition of the write data input signal IN from the logic-low state to the logic-high state at the time $T_3$, the write current $I_{WRT}$ increases from the negative magnitude $-I_{OST}$ to the positive magnitude $I_{OST}$ beginning approximately at the time $T_3$. Accordingly, the negative overshoot current pulse beginning at the time $T_2$ has a duration approximately equal to a duration $T_{BIT}$ of a single bit based on the single-bit transition of the write data input signal IN.

At a time $T_4$, one bit duration $T_{BIT}$ subsequent to the time $T_3$, the write data input signal IN is de-asserted from the logic-high state to the logic-low state. As a result, the control voltage $V_{FN}$ begins to decrease at the negative slope and the control voltage $V_{RN}$ begins to increase at the positive slope. In addition, the control voltage $V_{FP}$ increases substantially rapidly and the control voltage $V_{RP}$ decreases substantially rapidly. However, because the control voltage $V_{RP}$ did not increase greater than the decreasing magnitude of the control voltage $V_{FP}$ prior to the time $T_4$, the state of the rising-edge overshoot signal RS and the falling-edge overshoot signal FL do not change at the time $T_4$. As a result, the write predriver 154 can thus de-assert the positive signal PLSP and can assert the negative pulse signal PLSN based on the state of the write data input signal IN and the continuous state of the rising-edge overshoot signal RS and the falling-edge overshoot signal FL. As a result of the transition of the write data input signal IN from the logic-high state to the logic-low state at the time $T_4$, the write current $I_{WRT}$ decreases from the positive magnitude $I_{OST}$ to the negative magnitude $-I_{OST}$ beginning approximately at the time $T_4$. Accordingly, the positive overshoot current pulse beginning at the time $T_3$ has a duration approximately equal to a duration $T_{BIT}$ of a single bit based on the single-bit transition of the write data input signal IN.

At a time $T_5$, the control voltage $V_{RN}$ increases to a magnitude slightly greater than the decreasing magnitude of the control voltage $V_{FN}$. Therefore, the falling-edge overshoot signal FL is de-asserted from a logic-high state to a logic-low state based on the relative magnitude of the control voltages $V_{RN}$ and $V_{FN}$ (e.g., based on the comparator 84). Accordingly, upon de-assertion of the falling-edge overshoot signal FL, the write predriver 154 can de-assert the negative pulse signal PLSN, thus indicating the end of the negative overshoot current pulse. As a result, the write current $I_{WRT}$ increases beginning at the time $T_5$ from $-I_{OST}$ to $-I_{DATA}$ corresponding to a magnitude of current sufficient to continue to write the same state of data (e.g., opposite the magnitude $I_{DATA}$) absent an overshoot current pulse (e.g., approximately -40 mA). Therefore, the pulse duration of the negative overshoot current pulse provided by the negative pulse signal PLSN is greater than the duration $T_{BIT}$ of a single bit.

At a time $T_6$, the write data input signal IN is asserted from the logic-low state to the logic-high state, thus ending a consecutive three bits of same state data written to the magnetic medium, as demonstrated by three consecutive durations of $T_{BIT}$ from the time $T_5$ to the time $T_6$. As a result, the control voltage $V_{FP}$ begins to decrease at the negative slope and the control voltage $V_{RP}$ begins to increase at the positive slope, and the control voltage $V_{FN}$ increases substantially rapidly and the control voltage $V_{RN}$ decreases substantially rapidly. The write predriver 154 can thus likewise assert the positive pulse signal PLSP based on the state of the write data input signal IN and the state of the rising-edge overshoot signal RS. As a result of the transition of the write data input signal IN from the logic-low state to the logic-high state at the time $T_6$, the write current $I_{WRT}$ increases from the negative magnitude $-I_{DATA}$ to the positive magnitude $I_{OST}$ beginning approximately at the time $T_6$ to begin another positive overshoot pulse.

Accordingly, as demonstrated in the example of FIG. 5, the pulse duration control system 152 can set the maximum pulse duration of the positive overshoot current pulse and the negative overshoot current pulse, respectively, associated with the write current $I_{WRT}$ greater than a duration of a single bit based on the positive slope of the control voltages $V_{RP}$ and $V_{RN}$ and the negative slope of the control voltages $V_{FP}$ and $V_{FN}$. However, the pulse duration control system 152 can also set the pulse duration of the positive overshoot current pulse and the negative overshoot current pulse approximately equal to the width of a single bit for single-bit data transitions provided by the write data input signal IN. As a result, the magnetic disk-drive write system 150 can achieve substantially rapid data rates for drive optimization for consecutive bit writes based on the extended overshoot current pulses while substantially mitigating jitter for rapid data switching for data written to the magnetic medium.

Figure 6:
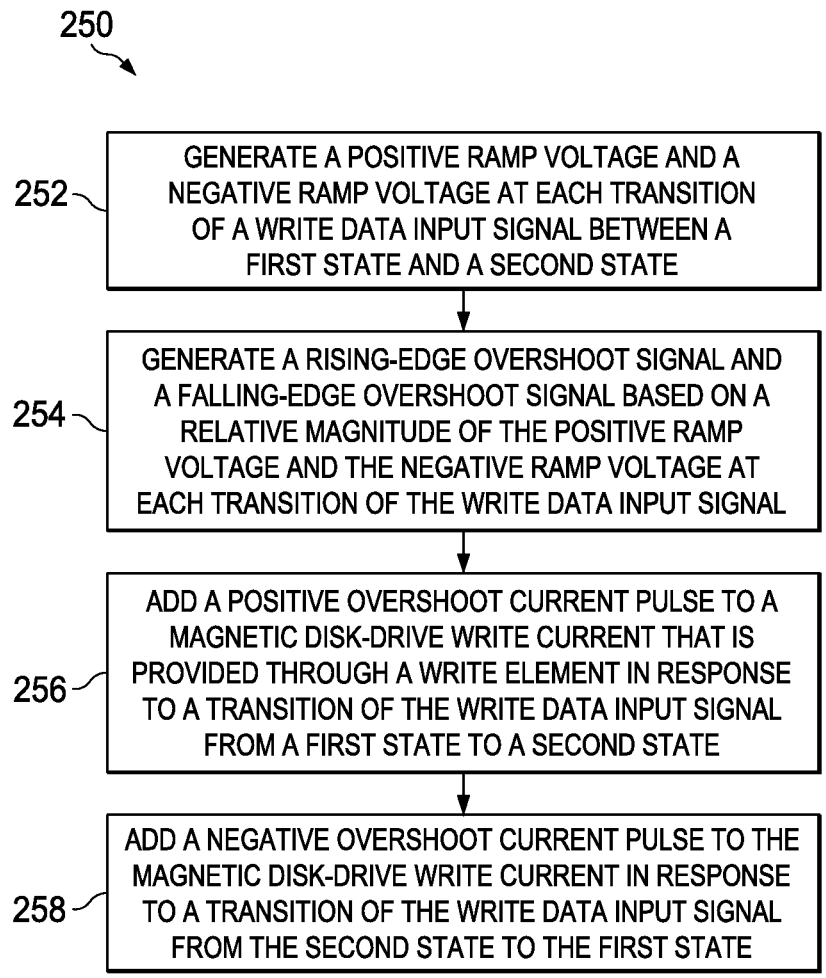
FIG. 6 illustrates an example of a method for implementing pulse duration control in a magnetic disk-drive system.

In view of the foregoing structural and functional features described above, certain methods will be better appreciated with reference to FIG. 6. It is to be understood and appreciated that the illustrated actions, in other embodiments, may occur in different orders and/or concurrently with other actions. Moreover, not all illustrated features may be required to implement a method.

FIG. 6 illustrates an example of a method 250 for implementing pulse duration control in a magnetic disk-drive system. At 252, a positive ramp voltage (e.g., the control voltages $V_{RP}$ and $V_{RN}$) and a negative ramp voltage (e.g., the control voltages $V_{FP}$ and $V_{FN}$) are generated at each transition of a write data input signal (e.g., the write data input signal IN) between a first state and a second state. At 254, a rising-edge overshoot signal (e.g., the rising-edge overshoot signal RS) and a falling-edge overshoot signal (e.g., the falling-edge overshoot signal FL) are generated based on a relative magnitude of the positive ramp voltage and the negative ramp voltage at each transition of the write data input signal. At 256, a positive overshoot current pulse is added to a magnetic disk-drive write current (e.g., the write current $I_{WRT}$) that is provided through a write element (e.g., the write element 158) in response to a transition of the write data input signal from a first state to a second state. The positive overshoot current pulse can have a maximum pulse-width of a predetermined duration based on the rising-edge overshoot signal and a minimum pulse-width of a single bit of data as provided by the write data input signal. At 258, a negative overshoot current pulse is added to the magnetic disk-drive write current in response to a transition of the write data input signal from the second state to the first state. The negative overshoot current pulse can have a maximum pulse-width of a predetermined duration based on the falling-edge overshoot signal and a minimum pulse-width of a single bit of data as provided by the write data input signal.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A pulse duration control system for a magnetic disk-drive system, the system comprising:
   a rise delay system configured to generate a first plurality of control voltages in response to a write data input signal changing between the first state and the second state;
   a fall delay system configured to generate a second plurality of control voltages in response to the write data input signal changing between the first state and the second state; and
   a comparator system configured to generate a rising-edge overshoot signal and a falling-edge overshoot signal based on a comparison of the first and second pluralities of control voltages, the rising-edge overshoot signal being associated with a duration of a positive overshoot current pulse for a write current at a transition of the write data input signal from the first state to the second state, and the falling-edge overshoot signal being associated with a duration of a negative overshoot current pulse for the write current at a transition of the write data input signal from the second state to the first state.

2. The system of claim 1, wherein the rise delay system comprises a first current source configured to generate the first plurality of control voltages and wherein the fall delay system comprises a second current source configured to generate the second plurality of control voltages, a magnitude of the first and second current sources being set to control a pulse-width associated with the positive overshoot current pulse and the negative overshoot current pulse.

3. The system of claim 1, wherein the comparator system is configured to reset the rising-edge overshoot signal in response to a transition of the write data input signal from the second state to the first state based on the comparison of the first and second pluralities of control voltages, and to reset the falling-edge overshoot signal in response to the transition of the write data input signal from the first state to the second state based on the comparison of the first and second pluralities of control voltages.

4. The system of claim 1, wherein the first plurality of control voltages are configured as positive slope ramp voltages and wherein the second plurality of control voltages are configured as negative slope ramp voltages.

5. The system of claim 1, wherein the first plurality of control voltages comprises a first ramp voltage that increases at a positive slope in response to the write data input signal switching from the first state to the second state and a second ramp voltage that increases at the positive slope in response to the write data input signal switching from the second state to the first state, and wherein the second plurality of control voltages comprises a third ramp voltage that decreases at a negative slope in response to the write data input signal switching from the first state to the second state and a fourth ramp voltage that decreases at the negative slope in response to the write data input signal switching from the second state to the first state, and wherein the comparator system is configured to generate the rising-edge overshoot signal based on comparing the first and third ramp voltages and to generate the falling-edge overshoot signal based on comparing the second and fourth ramp voltages.

6. The system of claim 5, wherein the positive slope and the negative slope are approximately equal and opposite.

7. The system of claim 5, wherein the rise delay system comprises:
   a first control node interconnecting a first current source and a first switch and on which the first ramp voltage is generated; and
   a second control node interconnecting a second current source and a second switch and on which the second ramp voltage is generated, the first and second switches being respectively activated in response to opposite states of the write data input signal;
   wherein the fall delay system comprises:

a third control node interconnecting a third current source and a third switch and on which the third ramp voltage is generated; and a fourth control node interconnecting a fourth current source and a fourth switch and on which the fourth ramp voltage is generated, the third and fourth switches being respectively activated concurrently with the first and second switches.

8. The system of claim 7, wherein the first and second switches are each coupled to a fifth current source, and wherein the third and fourth switches are each coupled to a sixth current source, the positive slope being set based on a current magnitude of the first and second current sources during a deactivated state of the respective first and second switches, and the negative slope being set based on difference of a current magnitude of the third and fourth current sources relative to the sixth current source during an activated state of the respective third and fourth switches.

9. The system of claim 7, wherein the rise delay system further comprises:

a first clamping circuit coupled to the first control node and being configured to set a minimum magnitude and a maximum magnitude of the first ramp voltage; and a second clamping circuit coupled to the second control node and being configured to set a minimum magnitude and a maximum magnitude of the second ramp voltage;

wherein the fall delay system further comprises:

a third clamping circuit coupled to the third control node and being configured to set a minimum magnitude and a maximum magnitude of the third ramp voltage; and a fourth clamping circuit coupled to the fourth control node and being configured to set a minimum magnitude and a maximum magnitude of the fourth ramp voltage.

10. An integrated circuit (IC) comprising the pulse duration control system of claim 1.

11. A magnetic disk-drive write system comprising a pulse duration control system comprising:

a pulse duration control system for a magnetic disk-drive system, the system comprising:

a rise delay system configured to generate a first plurality of control voltages in response to a write data input signal changing between a first state and a second state;

a fall delay system configured to generate a second plurality of control voltages in response to the write data input signal changing between the first state and the second state; and a comparator system configured to generate a rising-edge overshoot signal and a falling-edge overshoot signal based on a comparison of the first and second pluralities of control voltages, the rising-edge overshoot signal being associated with a duration of a positive overshoot current pulse for a write current at a transition of the write data input signal from the first state to the second state, and the falling-edge overshoot signal being associated with a duration of a negative overshoot current pulse for the write current at a transition of the write data input signal from the second state to the first state;

the magnetic disk-drive write system further comprising:

a write predriver configured to generate a first pulse signal based on the rising-edge overshoot signal and the write data input signal and a second pulse signal based on the falling-edge overshoot signal and the write data input signal, such that the first and second pulse signals have a maximum pulse-width of a predetermined duration based on the respective rising-edge and falling-edge overshoot signals and a minimum pulse-width of a single bit of data as provided by the write data input signal; and an output driver configured to generate a write current through a magnetic write element in response to the write data input signal, a magnitude of the write current including the positive overshoot current pulse in response to the transition of the write data input signal from the first state to the second state based on the first pulse signal and including the negative overshoot current pulse in response to the transition of the write data input signal from the second state to the first state based on the second pulse signal.

12. A method for implementing pulse duration control in a magnetic disk-drive system, the method comprising:

generating a positive ramp voltage and a negative ramp voltage at each transition of a write data input signal between a first state and a second state;

generating a rising-edge overshoot signal and a falling-edge overshoot signal based on a relative magnitude of the positive ramp voltage and the negative ramp voltage at each transition of the write data input signal;

adding a positive overshoot current pulse to a magnetic disk-drive write current that is provided through a write element in response to a transition of the write data input signal from a first state to a second state, the positive overshoot current pulse having a maximum pulse-width of a predetermined duration based on the rising-edge overshoot signal and a minimum pulse-width of a single bit of data as provided by the write data input signal; and adding a negative overshoot current pulse to the magnetic disk-drive write current in response to a transition of the write data input signal from the second state to the first state, the negative overshoot current pulse having a maximum pulse-width of a predetermined duration based on the falling-edge overshoot signal and a minimum pulse-width of a single bit of data as provided by the write data input signal, wherein the magnetic disk-drive write current is generated by:

a write predriver configured to generate a first pulse signal based on the rising-edge overshoot signal and the write data input signal and a second pulse signal based on the falling-edge overshoot signal and the write data input signal, such that the first and second pulse signals have a maximum pulse-width of a predetermined duration based on the respective rising-edge and falling-edge overshoot signals and a minimum pulse-width of a single bit of data as provided by the write data input signal; and an output driver configured to generate a write current through a magnetic write element in response to the write data input signal, a magnitude of the write current including the positive overshoot current pulse in response to the transition of the write data input signal from the first state to the second state based on the first pulse signal and including the negative overshoot current pulse in response to the transition of the write data input signal from the second state to the first state based on the second pulse signal.

13. The method of claim 12, wherein generating the positive ramp voltage and the negative ramp voltage comprises:

generating a first positive ramp voltage and a first negative ramp voltage at the transition of the write data input signal from the first state to the second state; and generating a second positive ramp voltage and second negative ramp voltage at the transition of the write data input signal from the second state to the first state.

14. The method of claim 12, wherein generating the positive ramp voltage and the negative ramp voltage comprises:
charging a first control node interconnecting a first current source and a first switch in response to deactivation of the first switch via the write data input signal, the positive ramp voltage being a positive ramp voltage signal associated with the first control node; and
discharging a second control node interconnecting a second current source and a second switch in response to activation of the second switch via the write data input signal, the negative ramp voltage being a negative ramp voltage signal associated with the second control node.

15. The method of claim 14, wherein discharging the second control node comprises activating the second switch to couple a third current source to the second control node to provide a current flow from the second control node based on a relative magnitude of the second and third current sources.

16. The method of claim 12, wherein generating the rising-edge overshoot signal and the falling-edge overshoot signal comprises:
resetting the rising-edge overshoot signal in response to the transition of the write data input signal from the second state to the first state; and
resetting the falling-edge overshoot signal in response to the transition of the write data input signal from the first state to the second state.

17. A magnetic disk-drive write system comprising:
a pulse duration control system configured to generate a rising-edge overshoot signal and a falling-edge overshoot signal based on a write data input signal, the rising-edge overshoot signal being associated with a positive overshoot current pulse of a write current and the falling-edge overshoot signal associated with a negative overshoot current pulse of the write current;
a write predriver configured to generate a first pulse signal based on the rising-edge overshoot signal and the write data input signal and a second pulse signal based on the falling-edge overshoot signal and the write data input signal, such that the first and second pulse signals have a maximum pulse-width of a predetermined duration based on the respective rising-edge and falling-edge overshoot signals and a minimum pulse-width of a single bit of data as provided by the write data input signal; and
an output driver configured to generate the write current through a magnetic write element in response to the write data input signal, a magnitude of the write current including the positive overshoot current pulse in response to the transition of the write data input signal from the first state to the second state based on the first pulse signal and including the negative overshoot current pulse in response to the transition of the write data input signal from the second state to the first state based on the second pulse signal,
wherein the pulse duration control system comprises:
a rise delay system configured to generate a first plurality of control voltages in response to the write data input signal changing between the first state and the second state;
a fall delay system configured to generate a second plurality of control voltages in response to the write data input signal changing between the first state and the second state; and
a comparator system configured to generate the rising-edge overshoot signal and the falling-edge overshoot signal based on a comparison of the first and second pluralities of control voltages.

18. The system of claim 17, wherein the rise delay system comprises a first current source configured to generate the first plurality of control voltages and wherein the fall delay system comprises a second current source configured to generate the second plurality of control voltages, a magnitude of the first and second current sources being set to control a pulse-width associated with the positive overshoot current pulse and the negative overshoot current pulse.

19. The system of claim 17, wherein the comparator system is configured to reset the rising-edge overshoot signal in response to a transition of the write data input signal from the second state to the first state based on the comparison of the first and second pluralities of control voltages, and to reset the falling-edge overshoot signal in response to the transition of the write data input signal from the first state to the second state based on the comparison of the first and second pluralities of control voltages.

* * * * *